(12) United States Patent
Sakata et al.

(10) Patent No.: US 6,343,003 B1
(45) Date of Patent: Jan. 29, 2002

(54) CAPACITOR ELEMENT AND BATTERY CELL

(75) Inventors: Koji Sakata; Shinako Okada; Junko Kurihara; Gaku Harada, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/187,757

(22) Filed: Nov. 9, 1998

(30) Foreign Application Priority Data

Nov. 14, 1997 (JP) .............................................. 9-313339

(51) Int. Cl.$^7$ ................................................. H01G 9/00
(52) U.S. Cl. ........................ 361/503; 361/502; 361/509; 361/510; 361/511
(58) Field of Search ................................ 361/503, 502, 361/433, 434, 517, 509, 505, 510, 511; 521/90

(56) References Cited

U.S. PATENT DOCUMENTS

| | | | | |
|---|---|---|---|---|
| 3,202,611 A | * | 8/1965 | Roy et al. ................... | 252/62.2 |
| 4,394,713 A | * | 7/1983 | Yoshida ....................... | 361/433 |
| 4,488,203 A | * | 12/1984 | Muranaka et al. .......... | 361/433 |
| 4,791,144 A | * | 12/1988 | Nagou et al. ................ | 521/90 |
| 5,136,473 A | * | 8/1992 | Tsuchiya et al. ............ | 361/502 |
| 5,381,303 A | * | 1/1995 | Yoshida et al. ............. | 361/502 |
| 5,426,561 A | * | 6/1995 | Yen et al. .................... | 361/502 |
| 5,557,497 A | * | 9/1996 | Ivanov et al. ............... | 361/502 |
| 6,097,587 A | * | 8/2000 | Inagawa et al. ............. | 361/502 |

FOREIGN PATENT DOCUMENTS

| | | |
|---|---|---|
| JP | 50-66761 | 6/1975 |
| JP | 60-254721 | 12/1985 |
| JP | 63-54208 | 10/1988 |
| JP | 7-240348 | 9/1995 |

* cited by examiner

Primary Examiner—Dean A. Reichard
Assistant Examiner—Nguyen T Ha
(74) Attorney, Agent, or Firm—Young & Thompson

(57) ABSTRACT

A capacitor element and a battery cell which a dry-up phenomenon is restricted and an internal resistance is small are provided. The capacitor element provides a porous separator which has ion permeability and the ability of insulation, a pair of carbon electrode layers having many successive through holes separated by the porous separator, a non-conductive gasket holding the surrounding ends of the carbon electrode layers, a pair of conductive separators holding the carbon electrode layers and the non-conductive gasket from the outside, electrolyte solution in the successive through holes of the carbon electrode layers, and minute particles which are more than 0.1 weight % and less than 5.0 weight % of the electrolyte solution. A battery cell provides electrolyte solution and positive/negative electrode active material layers containing minute particles which are more than 0.1 weight % and less than 5.0 weight % of the electrolyte solution in the successive through holes.

6 Claims, 4 Drawing Sheets

CAPACITOR ELEMENT AND BATTERY CELL

BACKGROUND OF THE INVENTION

The present invention relates to a capacitor element and a battery cell which are especially excellent in the ability to keep electrolyte solution and have small internal resistance.

DESCRIPTION OF THE RELATED ART

According to the conventional capacitor element and battery cell constituting electric double layer capacitor, electrolyte solution has been used. In this capacitor element and battery cell, the ability to keep electrolyte solution is a major factor to decide a life. Therefore various ideas have been applied to keep the electrolyte solution.

For example, the Japanese Patent Laid-Open Publication No. HEI 7-240348 discloses the capacitor element of the electric double layer capacitor having a means for restraining dry-up by forming an amorphous silica particle layer or an alumina particle layer in the minute holes of the porous separator and concentrating the electrolyte solution. This capacitor element is constituted of a porous separator which has ion permeability and the ability of insulation, a pair of carbon paste electrodes containing an aqueous solution type electrolyte separated by this porous separator, a non-conductive gasket holding these carbon paste electrodes at the surrounding ends of these carbon paste electrodes and a pair of conductive separators holding the carbon paste electrodes and the non-conductive gasket from the outside. In this capacitor element, the amorphous silica particle layer or the alumina particle layer and aqueous solution type electrolytic solution are concentrated on the minute hole wall of the porous separator.

An electrolytic capacitor providing a means for restraining dry-up of electrolyte solution of the electrolytic capacitor is disclosed in the Japanese Patent Laid-Open Publication No. SHO 50-66761 and No. SHO 60-254721 and Japanese Patent Publication No. SHO 63-54208. These electrolytic capacitors all have a gel electrolyte solution.

However, in the conventional capacitor element, there is a problem that internal resistance is large caused by that the concentration of the electrolyte solution makes the degree of movement of ion short.

SUMMARY OF THE INVENTION

It is therefore an object of the present invention to provide a capacity element and a battery cell having characteristics which a dry-up phenomenon is restrained and an internal resistance is small.

To solve the above mentioned problems, the capacitor element of the present invention provides a porous separator which has ion permeability and the ability of insulation, a pair of carbon electrode layers having many successive through holes separated by said porous separator, a non-conductive gasket holding the surrounding ends of said carbon electrode layers, a pair of conductive separators holding said carbon electrode layers and said non-conductive gasket from the outside, electrolyte solution in said successive through holes of said carbon electrode layers, and minute particles which are more than 0.1 weight % and less than 5.0 weight % of said electrolyte solution in said successive through holes of said carbon electrode layers.

The battery cell of the present invention provides a porous separator which has ion permeability and the ability of insulation, a positive electrode active material layer and a negative electrode active material layer having many successive through holes separated by said porous separator, a positive electrode current collector and a negative electrode current collector connecting to said positive electrode active material layer and said negative electrode active material layer, electrolyte solution in said successive through holes of said positive electrode active material layer and said negative electrode active material layer, and minute particles which are more than 0.1 weight % and less than 5.0 weight % of said electrolyte solution in said successive through holes of said positive electrode active material layer and said negative electrode active material layer.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
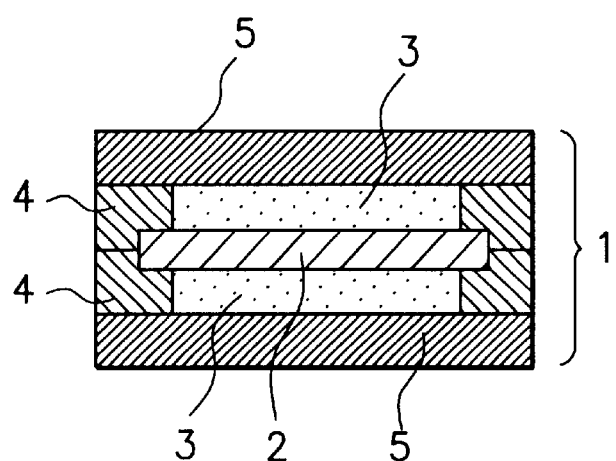
FIG. 1 is a sectional view of a first example of a first embodiment of a capacitor element of the present invention.

Referring now to the drawings, description will be given in detail of embodiments of the capacitor element and the battery cell in accordance with the present invention.

FIG. 1 is a sectional view of a first example of the first embodiment of the capacitor element of the present invention. As shown in FIG. 1, the capacitor element 1 of the present invention is constituted of a porous separator 2 which has ion permeability and the ability of insulation, a pair of carbon electrode layers 3 having many successive through holes separated by this porous separator 2, non-conductive gaskets 4 holding the surrounding ends of these carbon electrode layers 3 and a pair of conductive separators 5 holding the carbon electrode layers 3 and the non-conductive gaskets 4 from the outside. In these successive through holes of the carbon electrode layers 3, an electrolyte solution and minute particles which are more than 0.1 weight % and less than 5.0 weight % of this electrolyte solution are contained.

The minute particles are not limited to special material, super-minute particle type silica, silica gel, etc. are usable, however super-minute particle type silica which diameter is small is desirable. The size of the minute particle used in this is not limited, however the diameter of particle with less than 100 nm is good, the diameter with about 10 nm is desirable.

The carbon electrode layers 3 of the capacitor element of the present invention are formed by the two methods mentioned below. A first manufacturing method of the carbon electrode layers 3 is that grained electrode materials and minute particles are mixed and the minute particles are intercalated on the boundary face of the particles of the electrode materials, after this, binder resin is added to this mixed materials and sheet type electrodes are formed by making films of this mixed materials added the binder resin. In this case, it is possible that the grained electrode materials, the minute particles and the binder resin are mixed at the same time, however by the above mentioned method the minute particles are dispersed uniformly, therefore the above mentioned method is desirable. A second manufacturing method of the carbon electrode layers 3 is that the grained electrode materials and the binder resin are mixed and the sheet type electrodes are formed, after this the electrolyte solution contained the minute particles is infiltrated to the electrodes and the minute particles are contained to successive through holes of the inside of the electrodes.

A characteristic of the present invention is that the minute particles which are more than 0.1 weight % and less than 5.0 weight %, preferably more than 0.5 weight % and less than 1.0 weight % are intercalated in the successive through holes of the electrodes. Looking at the electrode part of the dry-up phenomenon of the electrolyte solution, the electrolyte solution is volatilized from the surface of the electrodes. Therefore, by intercalating the minute particles in the successive through holes and making the route from the center of the electrodes to the surface of the electrodes long in the successive through holes, making the time which the electrolyte solution reaches to the surface long and the dry-up phenomenon is possible to be restrained.

Therefore, the minute particles used are not limited, however the particles of small diameter are desirable. The diameter of the particles of the electrode material constituting electrodes of an electric double layer capacitor, an electrolyte capacitor and a battery is about a few $\mu$m and the diameter of the successive through holes of the activated carbon electrodes which is an electrode material of the electric double layer capacitor is about less than 100 nm. Thus, the size of the minute particles is desirably below 100 nm. The minute particles used to the present invention is desirably super-minute particle type silica having especially about 10 nm diameter.

The super-minute particle type silica is formed by the reaction of volatile chemical compound including silicon with vapor-phase and is different from the silica having concentration action used in the conventional technology, for example silica gel, white carbon and a water glass hydrolysis substance.

Moreover, at the present invention, the content of the minute particles is more than 0.1 weight % and less than 5.0 weight % of the electrolyte solution and is small, therefore the concentration state does not occur. Consequently, silica gel is usable.

In the present invention, the electrolyte solution is not concentrated, therefore the degree of movement of ion is hardly deteriorated. Therefore the electrode having small internal resistance is possible to be obtained. When the added quantity of the minute particles is exceeded 5.0 weight % of the electrolyte solution, the electrolyte solution is concentrated and is not able to be filled into the inside of the successive through holes. At the case of the added quantity of the minute particles is smaller than 0.1 weight % of the electrolyte solution, the effect of restraining the dry-up phenomenon does not occur. Therefore, the added quantity of the minute particles should be more than 0.1 weight % and less than 5.0 weight %, preferably in the range between more than 0.5 weight % and less than 1.0 weight %.

Figure 2:
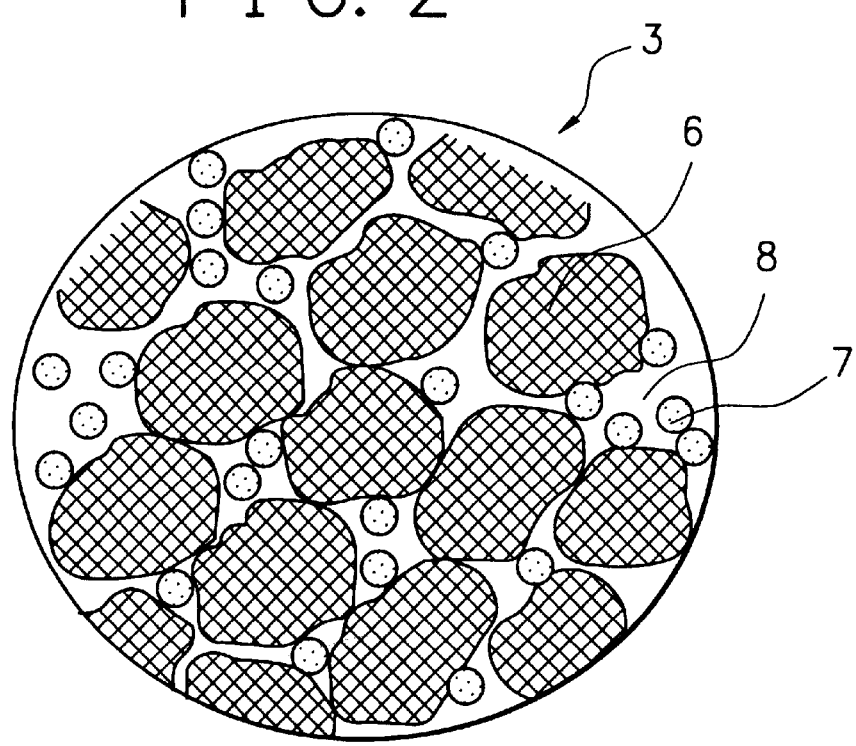
FIG. 2 is an expanded sectional view showing expanded a part of a carbon electrode layer of the capacitor element of FIG. 1.
Figure 3:
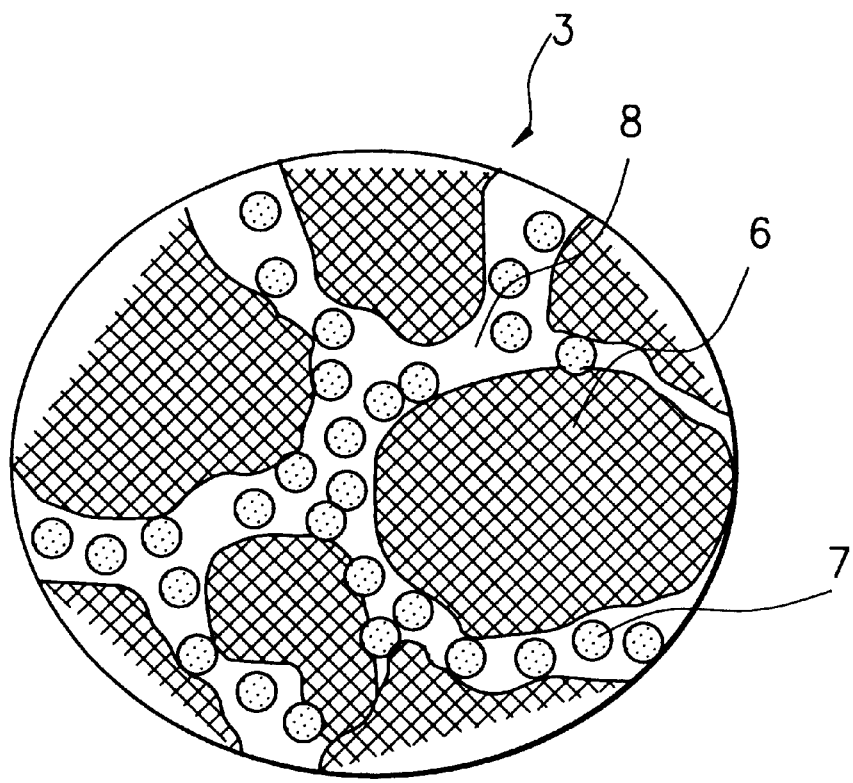
FIG. 3 is an expanded sectional view showing expanded a part of activated carbon of the carbon electrode layer of FIG. 2.

The first example of the first embodiment of the capacitor element 1 of the present invention is explained. As shown in FIG. 1, first, under the non-conductive gasket 4 which is made of unvulcanized butyl rubber with 0.2 mm thickness formed a ring type sheet with 5 mm inside diameter and 8 mm outside diameter by die cutting, the conductive separator 5 made of unvulcanized butyl rubber with 0.2 mm thickness formed a disk type sheet with 8 mm diameter by die cutting is disposed in concentric circles and crimped, and then a concave part is formed. In this concave part, the carbon electrode layer 3 mixed sulfuric acid with 30 weight %, powdered activated carbon and super-minute particle type anhydrous silica with 10 nm diameter in the weight ratio of 59.5:40.0:0.5 is filled. FIG. 2 is an expanded sectional view showing the inside of the carbon electrode layer 3 of the capacitor element 1, as shown in FIG. 2, the carbon electrode layer 3 is constituted of activated carbon 6, super-minute particle type anhydrous silica 7 and sulfuric acid aqueous solution 8. The activated carbon 6 has many successive through holes in the inside, the sulfuric acid aqueous solution 8 contained the super-minute particle type anhydrous silica 7 is infiltrated into the successive through holes. FIG. 3 is a further expanded sectional view showing the inside of the carbon electrode layer 3.

Next, as shown in FIG. 1, after the porous separator 2 made of polyolefin with 25 $\mu$m thickness and 6.5 mm diameter is disposed between the carbon electrode layers 3 in the concentric circles and then the porous separator 2 and the carbon electrode layers 3 coalesce, the pressure of 5 kg/cm$^2$ is applied from up and down direction and an unfinished capacitor element is left for three hours in the 125±5° C. temperature ambience keeping the pressure and unvulcanized rubber is vulcanized and put, the capacitor element 1 of the present invention is completed.

Figure 4:
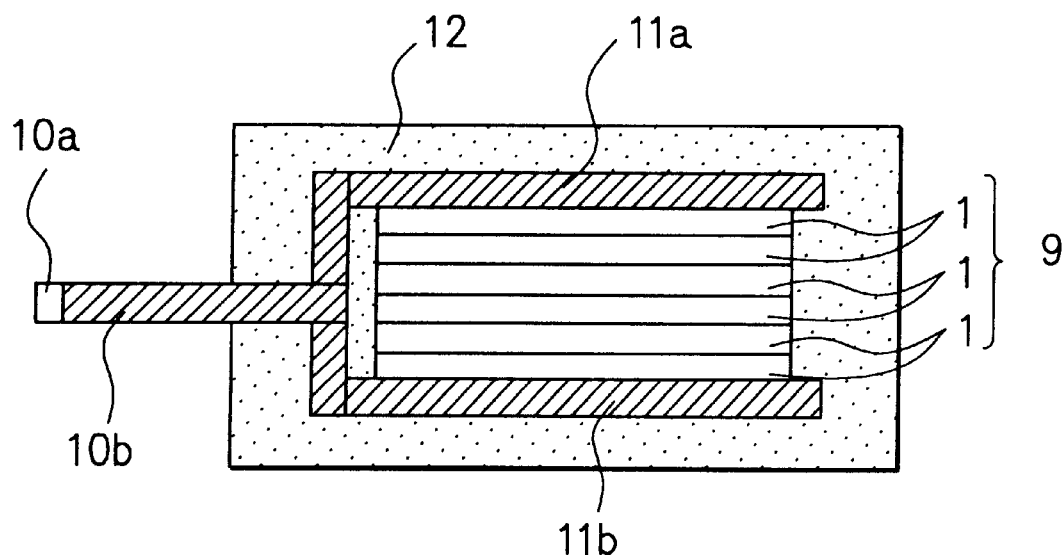
FIG. 4 is a sectional view showing an electric double layer capacitor using the capacitor element of FIG. 1.

As shown in FIG. 4, at the top part of laminated layers 9 laminated six capacitor elements 1 in series, a first electrode plate 11a having a first electrode lead 10a is dispose d, in FIG. 4, a first electrode lead 110a is overlapped with a second electrode lead 10b, as the same as above, at the bottom of the laminated layers 9, a second electrode plate 11b having a second electrode lead 10b is disposed. Next, the laminated layers 9, the first and the second electrode plate 11a and 11b are set at the resin molding die and the pressure of 30 kg/cm$^2$ is applied from up and down direction and package resin 12 is molded keeping this state and then an electric double layer capacitor withstand voltage 5.5 V of the first example of the first embodiment of the present invention is completed.

In a second example of the first embodiment of the present invention, the super-minute particle type anhydrous silica in the first example is replaced by silica gel. The constitution and the manufacturing method of the electric double layer capacitor of the second example is the same as the first example.

A first compared example is the conventional electrical double layer capacitor which does not contain a minute particle in the carbon electrode layer 3 of the first example of the first embodiment of the present invention. The manufacturing method of this conventional electric double layer capacitor is the same as the first example of the first embodiment of the present invention except the super-minute particle type anhydrous silica is not contained.

Table 1 shows the equivalent series resistance value and the average value of the changing rate at before and after the test which is the high temperature load test at 40±5° C., 5.5 V applied voltage for 1500 hours for ten pieces each of the electric double layer capacitor of the first and the second example of the first embodiment of the present invention and ten pieces of the electrical double layer capacitor of the first compared example of the conventional type.

TABLE 1

|  | Equivalent series resistance value (mΩ) | | Changing rate |
|---|---|---|---|
|  | Before test | After test |  |
| Example 1/ embodiment 1 | 305 | 641 | 2.1 times |
| Example 2/ embodiment 2 | 323 | 743 | 2.3 times |
| Example 1/ compared | 412 | 1236 | 3.0 times |

The equivalent series resistance value is measured by the voltage between the terminals of the electric double layer capacitor at the alternating current of 10 mA at 1 KHz. As shown in Table 1, the ESR equivalent series resistance i.e. internal resistance of the electric double layer capacitor of the first and the second example of the first embodiment of the present invention at before and after the high temperature load test is smaller than the conventional electric double layer capacitor.

Figure 5:
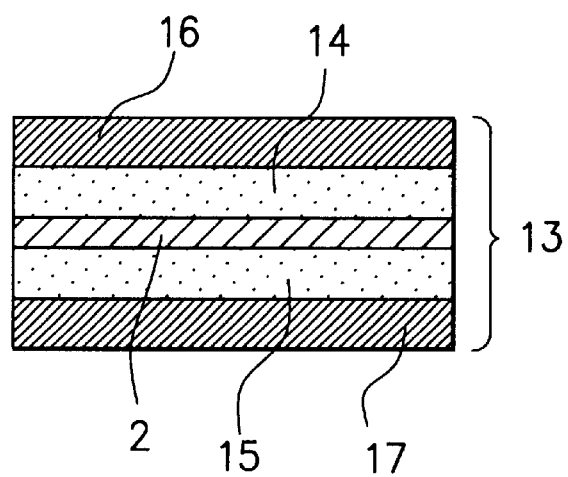
FIG. 5 is a sectional view of a first example of a second embodiment of a battery cell of the present invention.

Referring to FIG. 5, a first example of a second embodiment of a battery cell of the present invention is explained. FIG. 5 shows a battery cell 13, in the first example of the second embodiment of the present invention, the same sign numbers of the first embodiment is used for the same constituting elements. As shown in FIG. 5, the battery cell 13 of the present invention is constituted of the porous separator 2 which has ion permeability and the ability of insulation, a positive electrode active material layer 14 and a negative electrode active material layer 15 having many successive through holes separated by this porous separator 2 and a positive electrode current collector 16 and a negative electrode current collector 17 connecting to the positive electrode active material layer 14 and the negative electrode active material layer 15. In the successive through holes of the positive electrode active material layer 14 and the negative electrode active material layer 15, electrolyte solution and minute particles of more than 0.1 weight % and less than 5.0 weight % of the electrolyte solution are contained. The electrolyte solution is solution used the mixed solution of propylene carbonate and ethylene carbonate as a solvent and used tetrafluoro lithium phosphate LIPF6 as supporting salt. The positive electrode active material layer 14 includes cobalt acid lithium. The negative electrode active material layer 15 includes graphite.

Next, the first example of the second embodiment of the battery cell of the present invention is explained concretely. In FIG. 5, the positive electrode active material layer 14 is formed by the method that the cobalt acid lithium treated by heat at the temperature of 700 to 900° C. and the fluoroplastics powder being binder are mixed at the weight ratio 90:10 and N-methyl-2-pyrrolidone as a solvent is added a certain amount to make the viscosity of this mixed substance about 1000 cps and this mixed substance is formed in film with about 150 μm thickness on the positive electrode current collector 16 by using applicator and dried at 120 ° C. for 10 minutes. The negative electrode active material layer 15 is formed on the negative electrode current collector 17 by the same method as the positive electrode active material layer 14, by mixing graphite and the fluoroplastics powder at the weight ratio 90:10.

Figure 6:
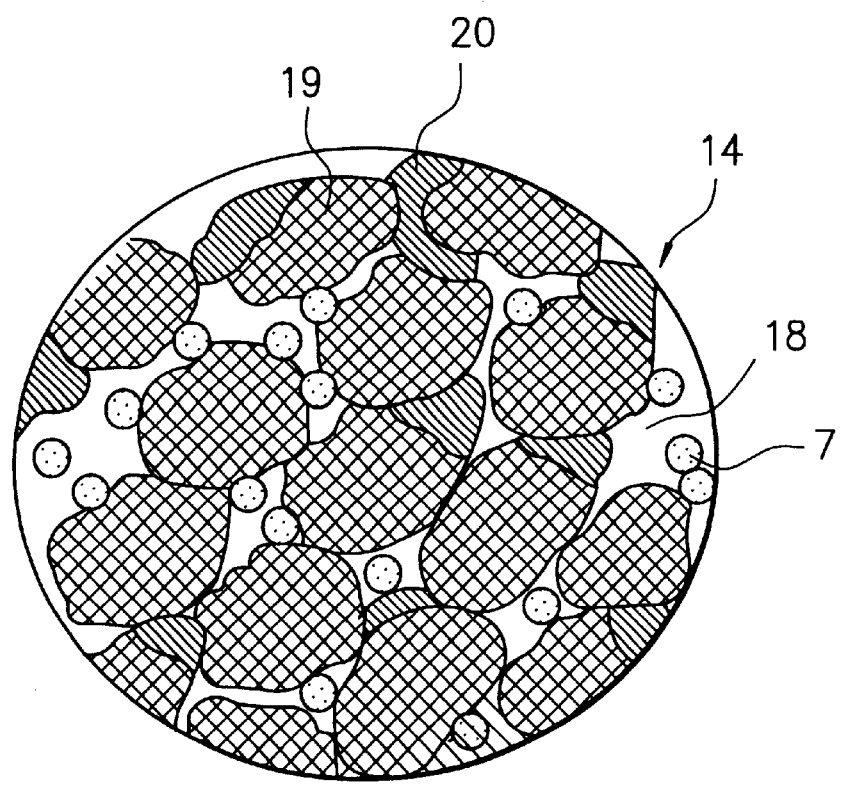
FIG. 6 is an expanded sectional view showing expanded a part of a positive electrode active material layer of the battery cell of FIG. 5.

Then, electrolyte solution 18 containing 1 weight % of the super-minute particle type anhydrous silica 7 is impregnated to the positive electrode active material layer 14 and the negative electrode active material layer 15. FIG. 6 is an expanded sectional view showing expanded a part of the positive electrode active material layer 14 of the battery cell. As shown in FIG. 6, the positive electrode active material layer 14 is constituted of a positive electrode active material particle 19, a binder 20, the electrolyte solution 18 and the super-minute particle type anhydrous silica 7. The super-minute particle type anhydrous silica 7 is dispersed to the successive through holes formed among the positive electrode active material particles 19. After these process, the battery cell 13 is formed by disposing in face to face position the positive electrode active material layer 14 and the negative electrode active material layer 15 containing the super-minute particle type anhydrous silica 7 and the electrolyte solution 18 via the porous separator 2.

Figure 7:
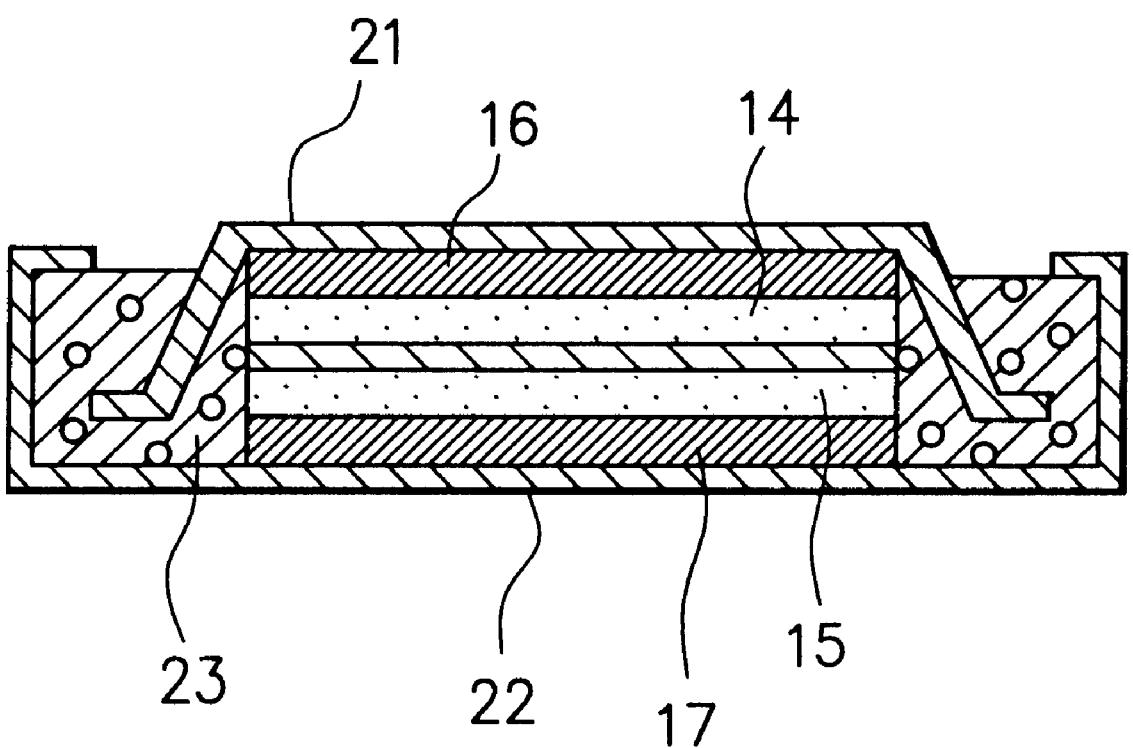
FIG. 7 is a sectional view showing a battery using the battery cell of FIG. 5.

FIG. 7 is a sectional view showing a battery using the battery cell. As shown in FIG. 7, the battery cell 13 is contained in a battery case, the positive electrode active material layer 14 is connected to a positive electrode can 21 via the positive electrode current collector 16 and the negative electrode active material layer 15 is connected to a negative electrode can 22 via the negative electrode current collector 17. The positive electrode can 21 and the negative electrode can 22 are insulated electrically with insulation packing 23 and the surrounding ends of the negative electrode can 22 is caulked and then the battery is completed.

A second compared example is the conventional battery using the electrolyte solution which does not include the super-minute particle type anhydrous silica 7 at the first example of the second embodiment of the present invention. The manufacturing method of this second compared example is the same as the first example of the second embodiment of the present invention except that the super-minute particle type anhydrous silica 7 does not included.

Table 2 shows the equivalent series resistance value and the average value of the changing rate at before and after the test which is the high temperature load test at 40±5° C. for 1500 hours for ten pieces of the first example of the second embodiment of the present invention and ten pieces of the second compared example of the conventional type.

TABLE 2

|  | Equivalent series resistance value (mΩ) | | Changing rate |
|---|---|---|---|
|  | Before test | After test |  |
| Example 1/ embodiment 2 | 812 | 1031 | 1.27 times |
| Example 2/ Compared | 832 | 1123 | 1.35 times |

The equivalent series resistance value is measured by the voltage between the terminals of the battery at the alternating current of 10 mA at 1 KHz.

The capacitor element and the battery cell of the present invention have the characteristics that the degree of movement of ion in the electrolyte solution is large, the ability of keeping the electrolyte solution is improved by containing the minute particles, the dry-up phenomenon is restrained and the internal resistance is small.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A capacitor element, comprising:
   a porous separator which has ion permeability and the ability of insulation;
   a pair of carbon electrode layers having many successive through holes separated by said porous separator;
   a non-conductive gasket holding the surrounding ends of said carbon electrode layers;
   a pair of conductive separators holding said carbon electrode layers and said non-conductive gasket from the outside;
   electrolyte solution in said successive through holes of said carbon electrode layers; and
   minute particles which are more than 0.1 weight % and less than 5.0 weight % of said electrolyte solution in said successive through holes of said carbon electrode layers.

2. A capacitor element in accordance with claim 1, wherein:
   said minute particles have a diameter less than 100 nm.

3. A capacitor element in accordance with claim 2, wherein:
   said minute particles are silica gel.

4. A capacitor element in accordance with claim 2, wherein:
   said minute particles are super-minute particle type anhydrous silica.

5. The capacitor element of claim 2, wherein said minute particles are smaller than 10 nm in diameter.

6. The capacitor element of claim 1, wherein said minute particles are more than 0.5 wt % and less than 1.0 wt % of said electrolyte solution.

* * * * *